Nov. 24, 1942. R. M. ISHAM 2,303,279
PROCESS FOR THE REGENERATION OF MERCURY CATALYSTS
Filed July 28, 1939
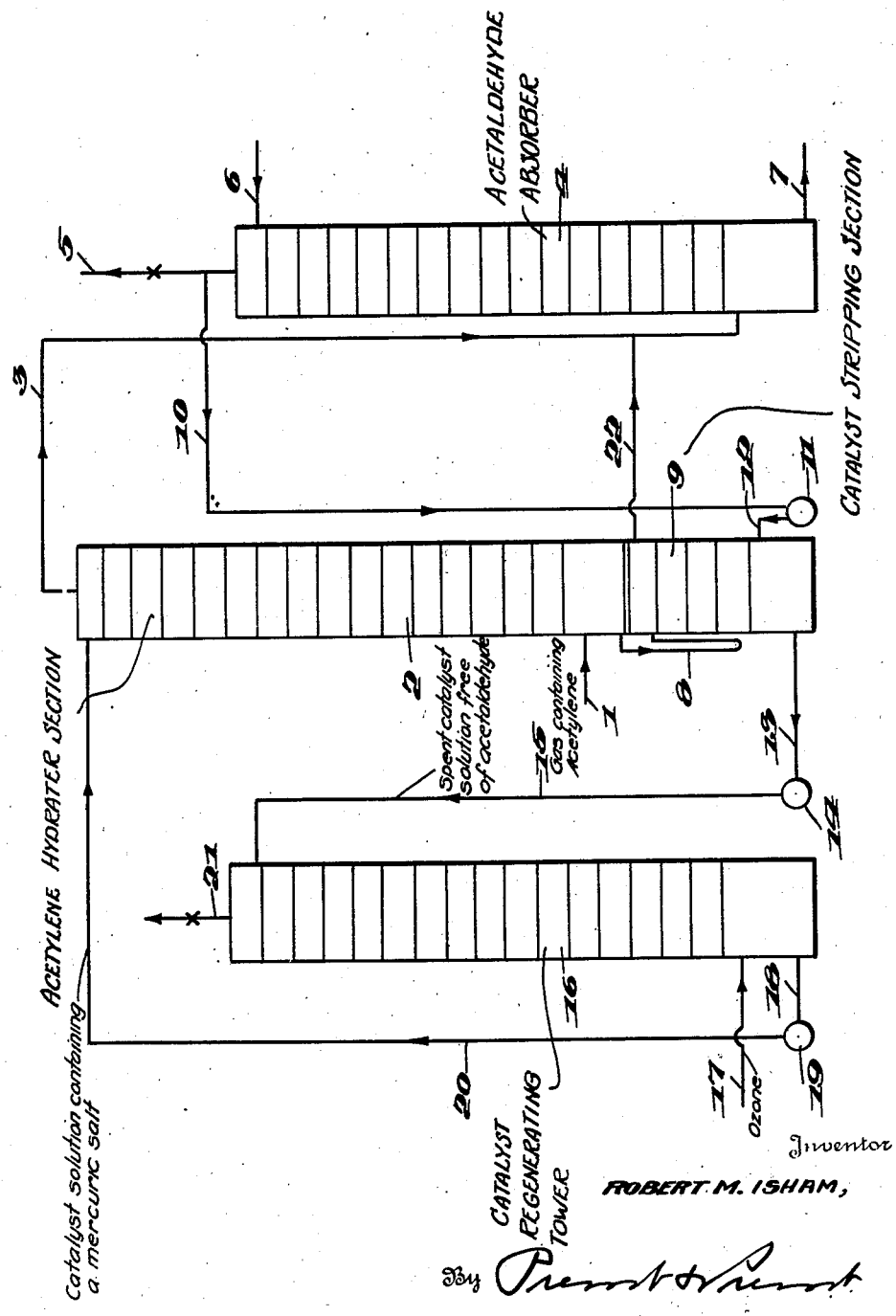
Inventor
ROBERT M. ISHAM,
By
Attorneys Patented Nov. 24, 1942

2,303,279

UNITED STATES PATENT OFFICE 2,303,279

PROCESS FOR THE REGENERATION OF MERCURY CATALYSTS

Robert M. Isham, Okmulgee, Okla., assignor to Danciger Oil & Refineries, Inc., Tulsa, Okla.

Application July 28, 1939, Serial No. 287,178

2 Claims. (Cl. 260—605)

This invention consists in new and useful improvements in a process for the regeneration of the catalytic activity of acid solutions of mercuric sulfate, or other mercury salts, and more particularly where such solutions are used as catalysts for the hydration of acetylene to produce acetaldehyde. Heretofore, these catalyst solutions have become partially or wholly inactive through continued use and while this process is highly effective in regenerating mercury catalysts used in the hydration of pure acetylene gas, it is particularly adapted to the regeneration of such spent catalysts used in promoting the hydration of the acetylene contained in gas mixtures produced by the high temperature thermal treatment of hydrocarbon gases or vapors.

It has long been known that when hydrocarbon gases or vapors are subjected to extremely high temperatures they decompose with the production of very considerable proportions of acetylene. This acetylene may be accompanied by various other gases, such as hydrogen, methane, carbon monoxide, etc., as well as by carbon black and various tarry and vaporous matters which may be removed in part by mechanical means, and in part by scrubbing with dilute sulfuric acid, as I have described in my copending application, Serial No. 287,179, filed July 28, 1939. It is also always accompanied by more or less ethylene and probably by minor proportions of olefins of higher molecular weight, such as propylene, etc., which are not dissolved or removed by scrubbing with dilute sulfuric acid.

It is well known that ethylene and other olefins react with mercuric salts to produce organo-metallic compounds which do not ionize with production of mercuric ion. This reaction is in part inhibited by the presence of acid in a solution of mercury salt, but even under these conditions there is a gradual combination of the mercury with the olefins present in the gas mixtures produced by thermal treatment of hydrocarbon gases and vapors, which results first in a reduction in the concentration of mercuric ion in solution, and later, with continued treatment, in the formation of a white precipitate of the mercury olefin complex. In consequence, after a comparatively short period of time, the solution begins to lose its catalytic activity for the hydration of the acetylene contained in the gas mixture and finally becomes wholly ineffective.

When pure acetylene is hydrated by contact with the heated acid solution of a mercuric salt, there is a very gradual loss in the activity of the catalyst due to a reduction of the mercuric salt to metallic mercury. The catalytic activity has, in some instances, been protected by adding to the mercuric solution a mild oxidizing agent such as ferric sulfate, which serves to maintain the mercury in its higher state of oxidation. Furthermore, the catalytic activity of a partially or wholly spent catalyst has been restored by the addition of any one or more of a number of oxidizing agents, such as chromic acid, nitric acid, etc., or by electrolytic oxidation.

However, where the inactivation of the catalyst results from the formation of organo-metallic compounds of the mercuric salt with olefins, the presence of mild oxidizing agents, such as ferric sulfate, has absolutely no protective effect, since these complexes are not reduction products of mercuric mercury. Moreover, those catalysts whose activity has been destroyed by combination of the mercuric salt with an olefin cannot be effectively regenerated by electrolytic oxidation or by treatment with dilute oxidizing agents such as chromic acid or nitric acid, although they may be regenerated by concentration and prolonged heating with concentrated nitric acid which finally oxidizes the olefin combined in the organo-metallic complex.

Ozone is known to be peculiarly effective for the destruction of olefins, due to its rapid addition at the point of ethylenic linkage, which results in the formation of an ozonide. The resulting ozonide decomposes in the presence of water to yield aldehydes and, in certain cases, ketones. Thus, ethylene is readily converted by ozone to formaldehyde in the presence of water and the formaldehyde readily oxidizes further to carbon dioxide and water.

I have now discovered that the above-mentioned organo-metallic compounds of a mercuric salt with an olefin can be rapidly and effectively destroyed by treatment with ozone. This results in the liberation of the original mercuric salt from the compound, with resulting complete restoration of the catalytic activity of the acid mercuric solution for the hydration of acetylene. The use of ozone for this purpose is peculiarly effective since it not only destroys the organo-metallic compounds resulting from the union of olefins with mercuric salts, with liberation of the mercuric salt, but likewise, due to its powerful oxidizing action, reconverts any metallic mercury or mercurous compounds which have been produced by reduction of the mercuric salt by acetylene or other reducing material, back to the mercuric condition, thereby entirely restoring its catalytic activity. In consequence, the process is equally effective for restoring the activity of the mercury catalyst whether pure acetylene, or gas mixtures containing acetylene and olefins, such as ethylene, are being treated for the hydration of the acetylene.

The operation of my process may be more particularly understood by reference to the accompanying drawing which illustrates it in a more or less diagrammatic manner.

In the operation of the process, the gas which contains acetylene and which may previously have been subjected to a preliminary purification, enters the system through the pipe 1 and passes upwardly through the bubble tower 2 which is of conventional design and constructed of corrosion-resistent material, not acted on by acid or mercuric ion. In this bubble tower, the gas is contacted with a catalyst solution containing a mercuric salt which may, for instance, be a solution of mercuric sulfate in dilute sulfuric acid, and which may contain dissolved ferric sulfate or other mild oxidizing agent and which is preferably maintained at a temperature of 60° C. to 80° C.

Under the influence of the catalyst solution, the acetylene is hydrated to acetaldehyde which is largely vaporized and passes out of the top of the bubble tower through pipe 3, together with the residual gas. The mixture of acetaldehyde vapor and residual gas is conveyed by the pipe 3 to an absorber 4, rising therethrough countercurrent to a descending flow of cold water which enters the absorber through pipe 6 and which serves to absorb the acetaldehyde vapor. The residual gas leaves the system through the pipe 5. The solution of acetaldehyde in water produced in the absorber 4 is pumped out through the pipe 7 to a rectifying column, not shown, for the production of pure acetaldehyde.

A slow circulation of revivified catalyst solution into the top of the bubble tower 2 is maintained by the pump 19, through the pipe 20. Thus, the catalyst solution is caused to flow downward through the bubble tower 2, and thence through the trap 8 into the exhausting section 9 which is preferably maintained at the same temperature as that of the bubble tower 2.

As the spent catalyst solution flows downwardly through the exhausting section 9, it passes countercurrent to a stream of residual gas drawn from the pipe 5 through pipe 10 by a compressor 11, and delivered to the base of the exhausting section through pipe 12. Any acetaldehyde remaining in the catalyst solution is thereby vaporized and passes with the gas through the pipe 22 to the absorber 4 for recovery.

The spent catalyst solution, free of acetaldehyde, accumulates in the base of the exhausting section 9 and is drawn thence through pipe 13 by pump 14 which delivers it through the pipe 15 into the top of a bubble tower 16. This tower is preferably maintained at a relatively low temperature, below 40° C., for instance. The spent catalyst solution flowing downward through this bubble tower 16 meets an ascending stream of ozonized air, or oxygen, which enters the base of the tower through pipe 17 and passes upwardly and out through pipe 21.

All mercury contained in the spent catalyst solution entering the bubble tower 16 is reconverted to mercuric ion by reaction with the ozone, and the reactivated solution may then be recirculated by the pump 19 to the bubble tower 2.

In order to compensate for water vapor carried off by the gas stream from the bubble tower 2 and by the air stream from the bubble tower 16, and to maintain the concentration of the catalyst constant, the requisite amount of water may be introduced through a line, not shown, into the suction side of pump 19, or it may conveniently be introduced by adding the correct proportion of steam to the gas which contains acetylene, in the pipe 1, entering the bubble tower 2.

In a typical embodiment of the process, a gas produced by partial combustion of natural gas and which contained about 4% acetylene and 0.6% ethylene was treated in the above described manner with a catalyst solution containing 183 cc. of concentrated sulfuric acid, 30 g. of mercuric sulfate, and 50 g. of ferric ammonium alum per quart, in an apparatus of the above described type. During the first few hours, the concentration of mercuric mercury in the solution fell from 22.2 g. per liter, to about 7 grams, due to the formation of a precipitate of the double compound of acetylene and mercury in the bubble tower 2. Thereafter, the formation of this compound was balanced by its dissociation into acetaldehyde and mercuric sulfate, and the concentration of mercuric mercury remained approximately constant in the catalyst solution for twenty-one days, when the test was discontinued. At the conclusion of the test, the solution was restored to its original strength by passing a stream of ozonized air through the bubble tower 16, whereby the above mentioned precipitate, together with any metallic mercury which may have been formed, was redissolved. Approximately 90% of the acetylene was converted to acetalydehyde throughout the test.

In a similar test in which the catalyst solution was not regenerated by treatment with ozone, it had become entirely inactive within three days.

From the foregoing it is believed that my invention may be readily understood by those skilled in the art without further description, it being borne in mind that numerous changes may be made in the details disclosed without departing from the spirit of my invention as set out in the following claims.

What I claim and desire to secure by Letters Patent is:

1. In a process of hydrating gas mixtures containing acetylene and olefins to acetaldehyde of the type comprising contacting said gas mixtures with an acid catalyst solution containing a mercury salt, separating out the acetalydehyde formed, withdrawing the spent catalyst solution from the contact zone for revivification and continuously recirculating the revivified catalyst solution through said contact zone; the improvement which consists in contacting said spent solution with a gas containing ozone to reconvert the mercury contained therein to mercuric ion.

2. In a process of hydrating gas mixtures containing acetylene and olefins to acetaldeyhde of the type contacting said gas mixtures with an acid catalyst solution containing a mercury salt, separating out the acetalydehyde formed, withdrawing the spent catalyst solution from the contact zone for revivification and continuously recirculating the revivified catalyst solution through said contact zone; the improvement which consists in contacting said spent solution with ozone to reconvert the mercury contained therein to mercuric ion.

ROBERT M. ISHAM.